United States Patent [19]
Inoue et al.

[11] Patent Number: 5,855,336
[45] Date of Patent: Jan. 5, 1999

[54] METHOD OF AND APPARATUS FOR ATTACHING LIGHT-SHIELDING LEADER TO PHOTOSENSITIVE MATERIAL ROLL

[75] Inventors: Akihisa Inoue; Hideharu Uematsu; Hisao Kikuchi; Kyoshi Tamai, all of Kanagawa-ken, Japan

[73] Assignee: Fuji Photo Film Co. Ltd., Kanagawa-Ken, Japan

[21] Appl. No.: 687,946

[22] Filed: Jul. 26, 1996

[30] Foreign Application Priority Data

Jul. 28, 1995 [JP] Japan .................................. 7-192331

[51] Int. Cl.⁶ .................................................. B65H 35/08
[52] U.S. Cl. ................................... 242/525.6; 242/348.4; 242/526.3
[58] Field of Search ................................ 242/526.34, 348, 242/348.4, 525.6, 525, 532.3, 525.3, 525.7, 532.1

[56] References Cited

U.S. PATENT DOCUMENTS

| | | | |
|---|---|---|---|
| 1,996,782 | 4/1935 | Wood | 242/348 |
| 3,756,527 | 9/1973 | Collins et al. | 242/526.3 X |
| 4,445,646 | 5/1984 | Karr et al. | 242/526.3 X |
| 5,049,928 | 9/1991 | Tirone | 242/348 X |
| 5,255,040 | 10/1993 | Pagano | 242/348.4 X |
| 5,528,326 | 6/1996 | Lawther | 242/348 X |

FOREIGN PATENT DOCUMENTS

| | | | |
|---|---|---|---|
| 300815 3 | 1/1988 | Japan | 242/526.3 |
| 3218457 | 9/1988 | Japan | 242/526.3 |

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A photosensitive material roll is mounted on a take-up shaft, and a light-shielding film having a width larger than the width of the photosensitive material roll is bonded to the leading end portion of the photosensitive material roll. A pair of slitters are positioned in respective slitting start positions on opposite sides of the leading end portion of the photosensitive material roll and spaced from each other by a distance substantially equal to the width of the photosensitive material roll. The light-shielding film is slit into a predetermined width larger than the width of the photosensitive material roll by moving the slitters away from each other in a direction parallel to the longitudinal axis of the take-up shaft while rotating the take-up shaft to take up the light-shielding film around the photosensitive material roll.

5 Claims, 10 Drawing Sheets

METHOD OF AND APPARATUS FOR ATTACHING LIGHT-SHIELDING LEADER TO PHOTOSENSITIVE MATERIAL ROLL

BACKGROUND OF THE INVENTION

1. Field of the Invention

This invention relates to a method of and an apparatus for attaching a light-shielding leader to a light-room loading photosensitive material roll.

2. Description of the Related Art

Figure 9:
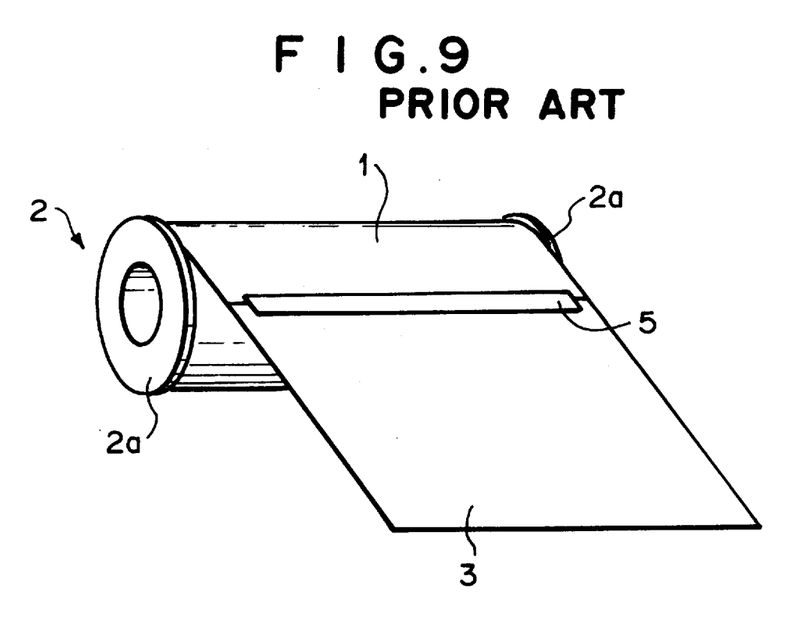
FIG. 9 is a perspective view showing a light-shielding leader attached to a photosensitive material roll by a prior art method.
Figure 10:
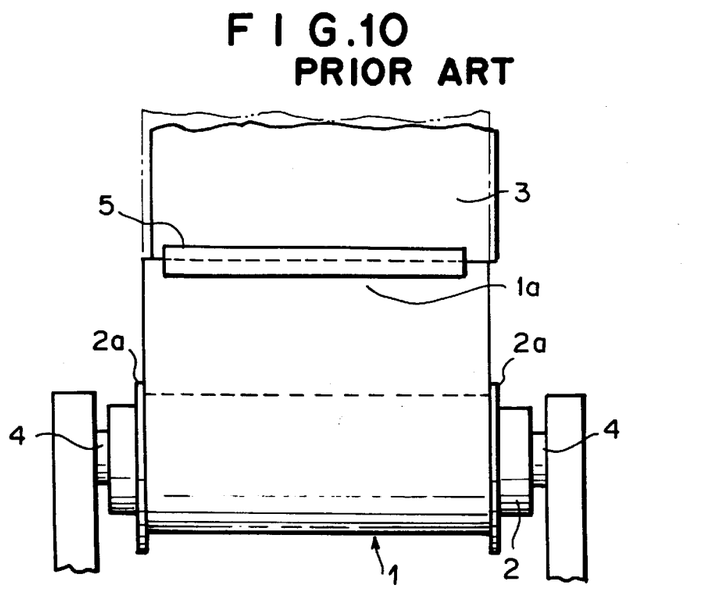
FIG. 10 is an exaggerated view showing a state in which a light-shielding leader is bonded to the leading end portion of a photosensitive material roll out of alignment with the leading end portion.

A photosensitive material in a continuous length is taken up around a core 2 having a pair of light-shielding flanges 2a spaced from each other by a distance substantially equal to the width of the photosensitive material as shown in FIG. 9 in a dark room, and the photosensitive material roll 1 thus obtained is mounted on a take-up shaft 4 as shown in FIG. 10. Then a light-shielding leader 3 substantially equal to the photosensitive material in width is bonded to the leading end portion 1a of the photosensitive material roll 1, for instance, by adhesive tape 5 and the core 2 is rotated, whereby the light-shielding leader 3 is wrapped around the photosensitive material roll 1 and a light-room loading photosensitive material roll is obtained.

There have been known techniques in which slitters are shifted while the web is running in order to change the size of the web as disclosed, for instance, in Japanese Unexamined Patent Publication No. 47(1972)-5795.

Figure 11:
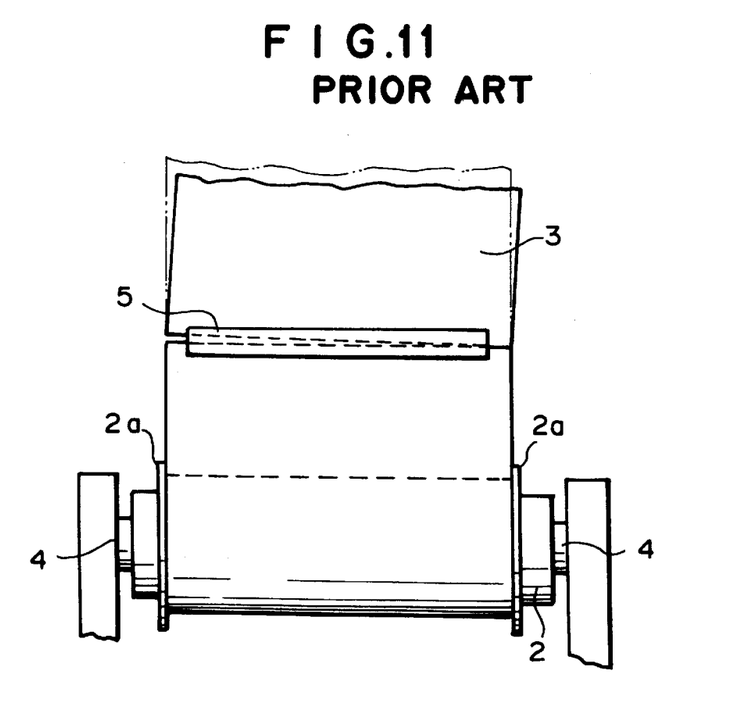
FIG. 11 is an exaggerated view showing a state in which a light-shielding leader is bonded to the leading end portion of a photosensitive material roll at an angle thereto.

It is difficult to accurately align the light-shielding leader 3 having a width substantially equal to that of the photosensitive material roll 1 with the leading end portion 1a thereof. Accordingly the light-shielding leader 3 can be sometimes bonded to the leading end portion 1a out of alignment with the leading end portion 1a as shown in FIG. 10 and sometimes bonded to the leading end portion 1a at an angle to the leading end portion 1a as shown in FIG. 11, which results in improper positioning of the side edges of the light-shielding leader 3, which results in deterioration in light-shielding performance of the leader 3 and a product defective in light-shielding.

Further there has been a problem that many light-shielding leaders 3 having different widths must be prepared according to the widths of photosensitive material rolls 1.

SUMMARY OF THE INVENTION

In view of the foregoing observations and description, the primary object of the present invention is to provide a method of and an apparatus for attaching a light-shielding leader to a photosensitive material roll which, by application of the technique disclosed in Japanese Unexamined Patent Publication No. 47(1972)-5795, can ensure a light-shielding performance of the light-shielding leader and can apply the light-shielding leader to different widths of photosensitive material rolls by use of a width of light-shielding leader material.

In accordance with the present invention, there is provided a method of attaching a light-shielding leader to a light-room loading photosensitive material roll comprising the steps of mounting the photosensitive material roll on a take-up shaft, bonding a light-shielding film having a width larger than the width of the photosensitive material roll to the leading end portion of the photosensitive material roll, positioning a pair of slitters in respective slitting start positions on opposite sides of the leading end portion of the photosensitive material roll spaced from each other by a distance substantially equal to the width of the photosensitive material roll, and slitting the light-shielding film into a predetermined width larger than the width of the photosensitive material roll by moving the slitters away from each other in a direction parallel to the longitudinal axis of the take-up shaft while rotating the take-up shaft to take up the light-shielding film around the photosensitive material roll.

The slitters may be moved away from each other in a direction parallel to the longitudinal axis of the take-up shaft until the distance between the slitters reaches a predetermined value larger than the width of the photosensitive material roll and then held there for a predetermined time while the take-up shaft is rotated to take up the light-shielding film around the photosensitive material roll.

Otherwise the slitters may be further moved toward each other to said respective slitting start positions after they are held in said positions where the distance between the slitters is said predetermined value.

The predetermined width larger than the width of the photosensitive material roll is a width required to ensure the light-shielding effect of the light-shielding leader. For example, when the core of the photosensitive material roll has an inclined surface on the inner side of each light-shielding flange, the predetermined width may be such that opposite edge portions of the light-shielding leader can cover the inclined surfaces of the light-shielding flanges.

Said predetermined time for which the slitters are held in said positions where the distance between the slitters is said predetermined value, is a time necessary to obtain said predetermined width in a length necessary to ensure the light-shielding effect of the light-shielding leader.

In accordance with the present invention, there is further provided an apparatus for attaching a light-shielding leader to a light-room loading photosensitive material roll comprising a take-up shaft on which the photosensitive material roll is mounted, a pair of slitters which are movable in a direction parallel to the longitudinal axis of the take-up shaft and slit opposite edges of a light-shielding film which has a width larger than the width of the photosensitive material roll and is bonded to the leading end portion of the photosensitive material roll, and a slitter moving means which moves the slitters in synchronization with each other while the take-up shaft is rotated.

Thus in accordance with the present invention, a light-shielding film wider than the photosensitive material roll is bonded to the leading end of the photosensitive material roll and then slit into a predetermined width while the light-shielding film is wound around the photosensitive material roll. Accordingly, even if the light-shielding film is bonded to the leading end portion of the photosensitive material roll out of alignment or at an angle to some extent, opposite edges of the light-shielding leader can be properly cut. Further since the light-shielding leader thus slit from a wide light-shielding film has a portion wider than the photosensitive material roll, opposite edge portions of the wide portion are bent along the inner surfaces of the light-shielding flanges as the light-shielding leader is taken up around the photosensitive material roll, whereby the light-shielding effect of the light-shielding leader is further improved.

Further when the wide portion of the light-shielding leader has such a width that opposite edge portions thereof cover the inclined surfaces of the light-shielding flanges, the light-shielding effect of the light-shielding leader is further enhanced.

Further in accordance with the present invention, photosensitive material rolls of different widths can be attached with a light-shielding leader by use of a width of light-shielding film.

Accordingly the space for storing wrapping materials can be saved and the production lot of the light-shielding film can be increased, whereby cost of wrapping material can be down. At the same time, the frequency of changing the light-shielding film on the processing machine can be greatly reduced.

Further in accordance with the method and apparatus of the present invention, light-shielding leaders of a shape optimal to light-shielding can be produced easily and continuously.

DESCRIPTION OF THE PREFERRED EMBODIMENT

Figure 1:
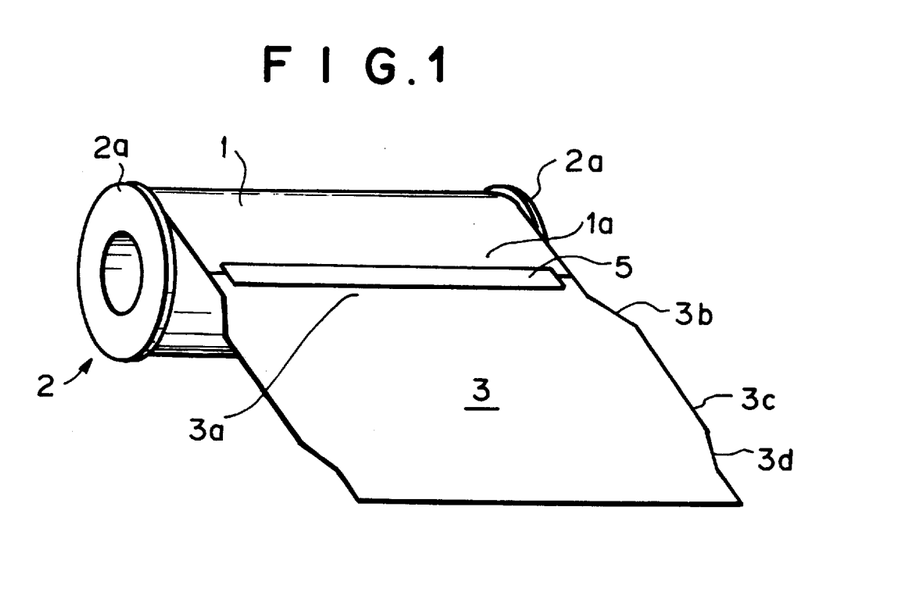
FIG. 1 is a perspective view showing a photosensitive material roll attached with a light-shielding leader by the method of the present invention with the light-shielding leader unrolled.
Figure 2A:
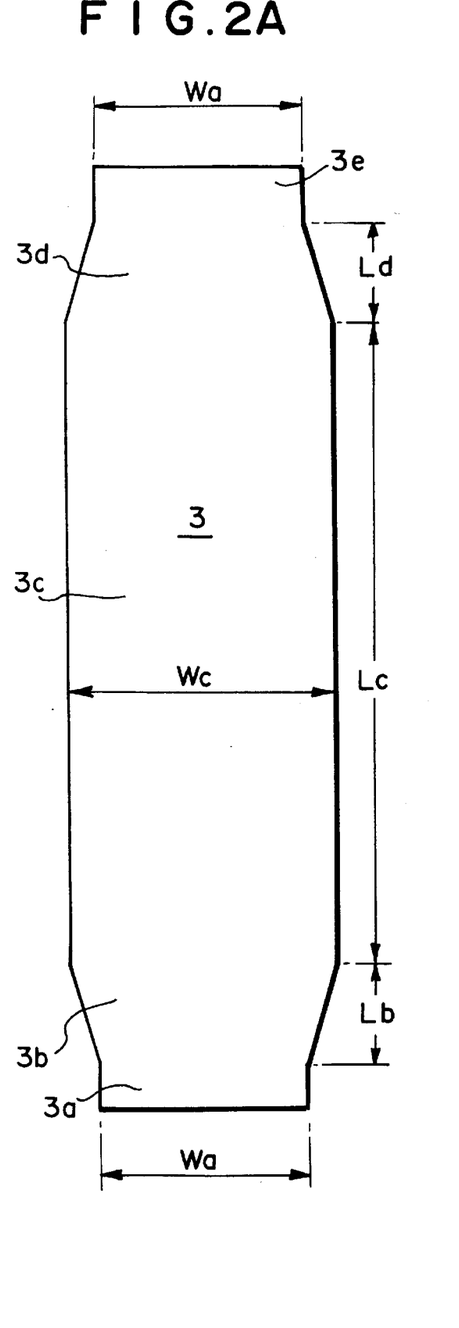
FIGS. 2A and 2B are plan views showing different shapes of the light-shielding leaders.

In FIG. 1, a photosensitive material in a continuous length is taken up around a core 2 having a pair of light-shielding flanges 2a, thereby forming a photosensitive material roll 1, and a trailing end portion 3a of a light-shielding leader 3 is attached to the leading end portion 1a of the photosensitive material roll 1 by a an adhesive tape 5. As shown in FIG. 2A, the light-shielding leader 3 comprises a short trailing end portion 3a having a width Wa substantially equal to the width of the photosensitive material roll 1, a rearward tapered portion 3b having a width increasing forward from the front end of the trailing end portion 3a and a length of Lb, a large width portion 3c having a width of Wc and a length of Lc and extending forward from the rearward tapered portion 3b, a forward tapered portion 3d having a width reducing forward from the front end of the large width portion 3c and a length of Ld, and a short leading end portion 3e having a width Wa substantially equal to the width of the photosensitive material roll 1.

Figure 2B:
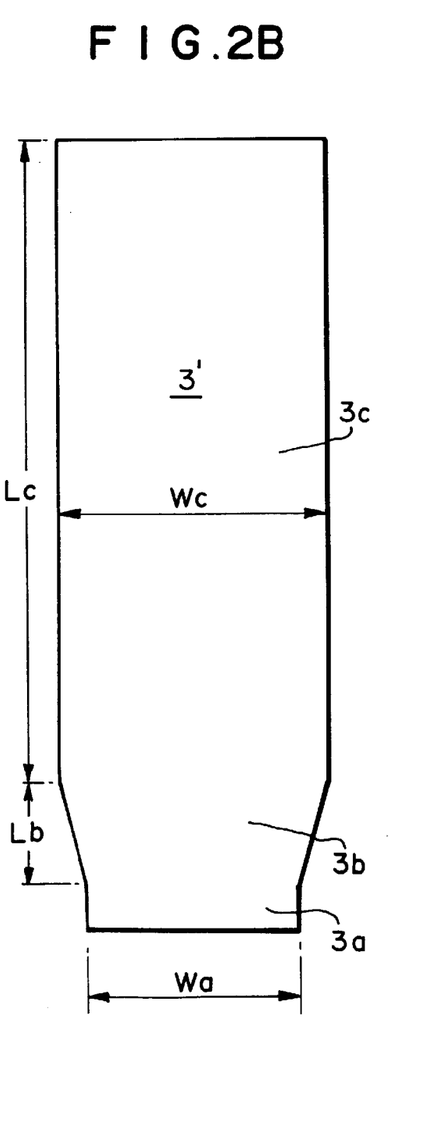

The light-shielding leader 3 shown in FIG. 2A is formed by slitting a light-shielding film in the form of a roll with an apparatus of the present invention to be described later, and the light-shielding leader 3' shown in FIG. 2B is formed by slitting a light-shielding film in the form of a sheet with an apparatus of the present invention. The light-shielding leader 3' shown in FIG. 2B differs from the light-shielding leader 3 shown in FIG. 3A in that it has neither the forward tapered portion 3d nor the leading end portion 3e.

Figure 3A:
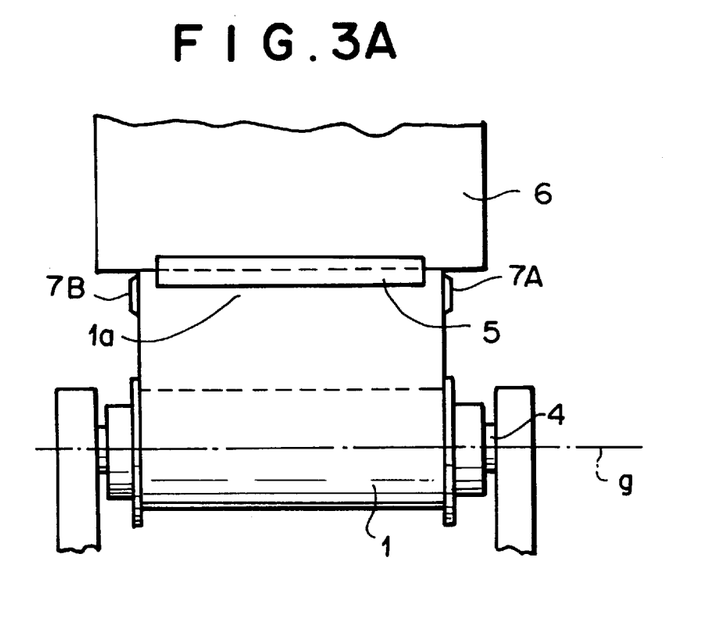
FIGS. 3A and 3B are views for illustrating the method of the present invention.

FIG. 3A shows a state where the photosensitive material roll 1 is mounted on a take-up shaft 4 and a light-shielding film 6 wider than the photosensitive material roll 1 is bonded to the leading end portion 1a of the roll 1 by an adhesive tape 5 with a pair of slitters 7A and 7B (to be described later) positioned in respective slitting start positions on opposite sides of the leading end portion 1a. In the slitting starting positions, the slitters 7A and 7B are spaced from each other by a distance substantially equal to the width of the photosensitive material roll 1.

When the take-up shaft 4 is rotated in the state shown in FIG. 3A, the light-shielding film 6 is slit into a width of Wa by the slitters 7A and 7B as the light-shielding film 6 is taken up around the photosensitive material roll 1, whereby the trailing end portion 3a of the light-shielding leader 3 is formed.

Figure 3B:
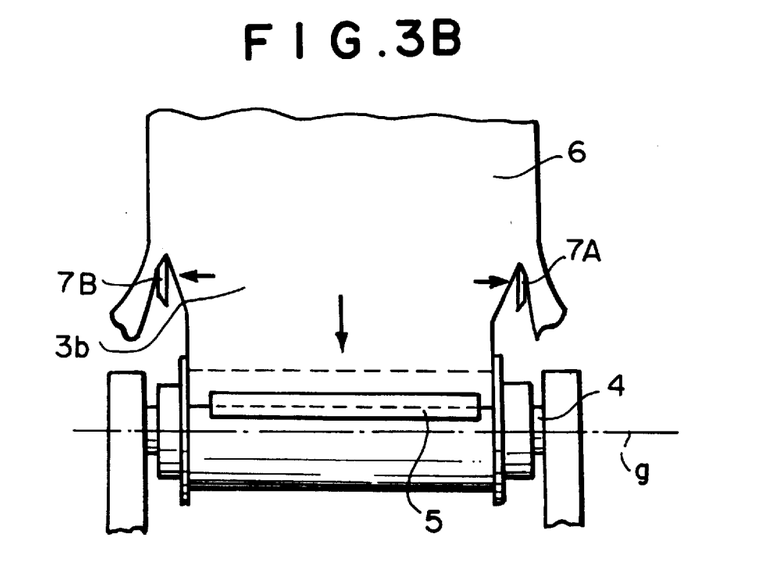

With the light-shielding film 6 kept taken up around the photosensitive material roll 1, the slitters 7A and 7B are moved away from each other in synchronization in a direction parallel to the longitudinal axis g of the take-up shaft 4 as shown in FIG. 3B, whereby the rearward tapered portion 3b is formed.

When the distance between the slitters 7A and 7B reaches the width Wc of the large width portion 3c, the slitters 7A and 7B are stopped there for a predetermined time, whereby the light-shielding film 6 is slit into a width of Wc over a length of Lc and the large width portion 3c is formed. Thereafter, the slitters 7A and 7B are moved toward each other to the slitting starting positions and stopped there. Thus the forward tapered portion 3d and the leading end portion 3e having a width Wa substantially equal to the width of the photosensitive material roll 1 are formed. Then the light-shielding leader 3 thus formed is cut off the light-shielding film 6 in the transverse direction thereof. Thus attachment of the light-shielding leader 3 to the photosensitive material roll 1 is completed.

Figure 4A:
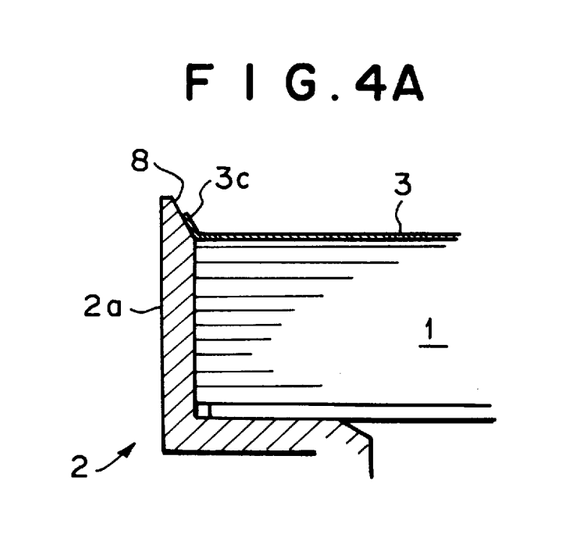
FIGS. 4A and 4B are cross-sectional views showing the light-shielding leaders attached to photosensitive material rolls having different light-shielding flanges.
Figure 4B:
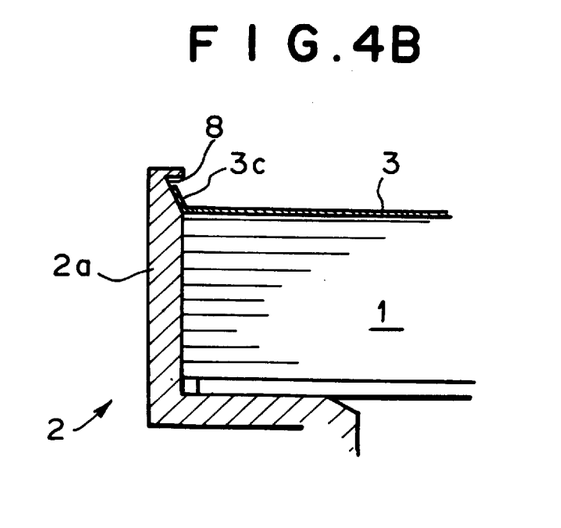

The width Wc of the large width portion 3c is set so that the light-shielding effect of the light-shielding leader 3 is ensured. For example, when the core 2 of the photosensitive material roll 1 has an inclined surface 8 on the inner side of each light-shielding flange 2a as shown in FIGS. 4A or 4B, the width Wc of the large width portion 3c may be such that opposite edge portions of the large width portion 3c can cover the inclined surfaces 8 of the light-shielding flanges 2a over a sufficient width. When the width Wa of the photosensitive material roll 1 is, for instance, about 300 mm, the width Wc of the large width portion 3c may be about 305 mm to 306 mm. The length Lc of the large width portion 3c is also set so that the light-shielding effect of the light-shielding leader 3 is ensured. In this particular embodiment, the length Lc of the large width portion 3c is not smaller than 750 mm and the lengths Lb and Ld of the tapered portions 3b and 3d are not smaller than 90 mm.

Figure 5:
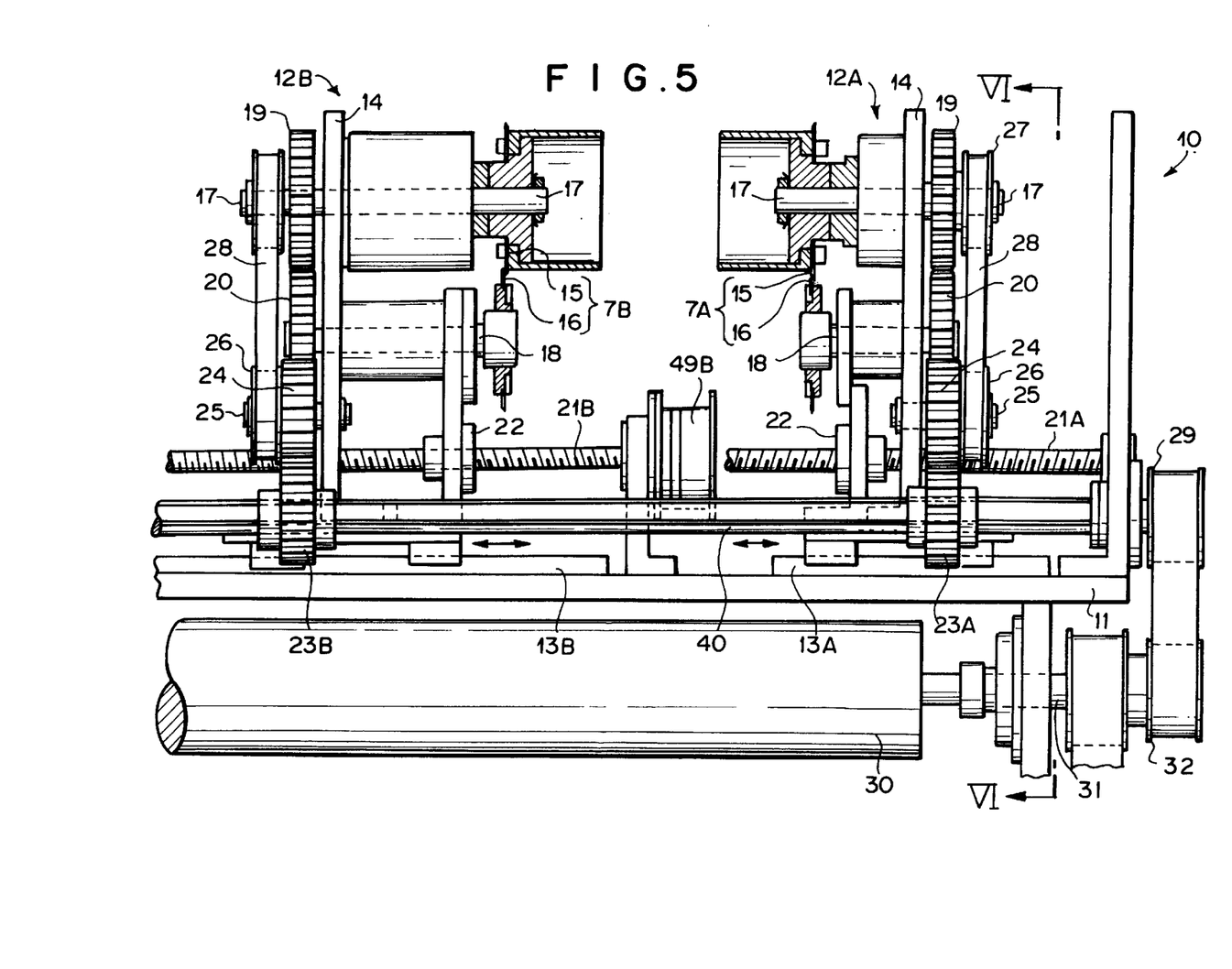
FIG. 5 is a fragmentary front view partly in cross-section showing a slitting machine which can be employed for carrying out the method of the present invention.
Figure 6:
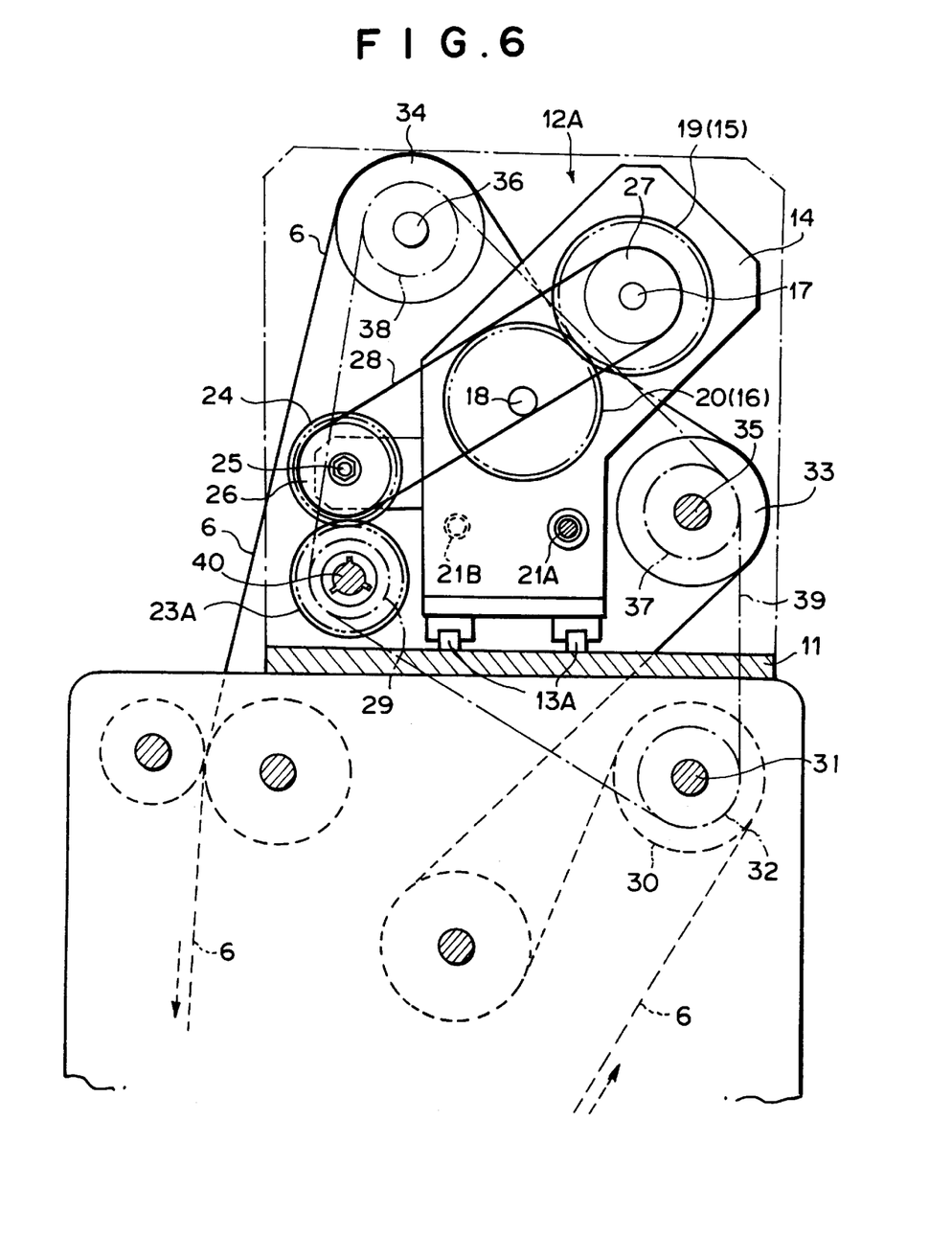
FIG. 6 is a cross-sectional view taken along line VI—VI in FIG. 5.
Figure 7:
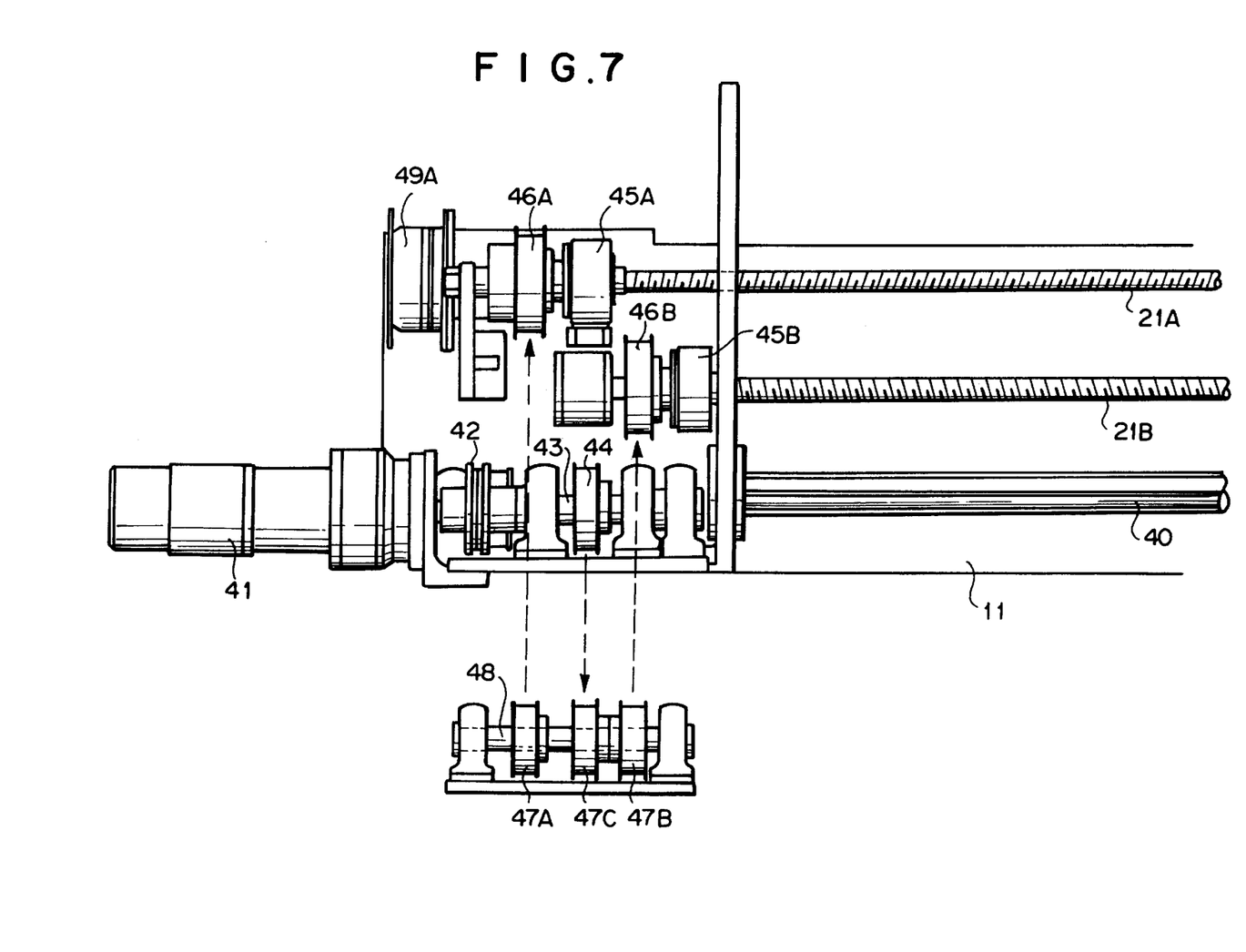
FIG. 7 is a plain view showing the leadscrew drive section in the slitting machine shown in FIG. 5.

FIGS. 5 to 7 show a slitting machine 10 which can be employed for carrying out the method of the present invention.

As shown in FIG. 5, the slitting machine 10 comprises a pair of slitting sections 12A and 12B which are mounted on a base 11 and are slidable in the direction of the longitudinal axis of the take-up shaft 4 (left and right in FIG. 5) carrying thereon the slitters 7A and 7B, respectively.

The right side (reference side) slitting section 12A comprises a base plate 14 mounted on a pair of relatively short rails 13A (FIG. 6), which are fixed to the base 11, to be movable along the rails 13A. The slitter 7A comprises an upper rotary cutting blade 15 and a lower cutting blade 16. The upper rotary cutting blade 15 is mounted on an upper shaft 17 which is supported for rotation on the base plate 14 and the lower rotary cutting blade 16 is mounted on a lower shaft 18 which is supported for rotation on the base plate 14. Gears 19 and 20 are fixed respectively to the upper and lower shafts 17 and 18 and are in mesh with each other so that the upper and lower cutting blades 15 and 16 are rotated in opposite directions.

A reference side leadscrew 21A driven by a drive system shown in FIG. 7 is mounted on the base 11 to extend in parallel to the direction of travel of the slitting section 12A. A member 22 having a threaded hole in mesh with the leadscrew 21A is fixed to the base plate 14 of the slitting section 12A so that the slitting section 12A is moved left and right in response to rotation of the leadscrew 21A.

A spline shaft 40 is disposed in parallel to the leadscrew 21A. A drive gear 23A is fitted on the spline shaft 40 to be rotated together with the spline shaft 40 and to be slidable along the spline shaft 40 in response to travel of the base plate 14 of the slitting section 12A. A shaft 25 to which a gear 24 in mesh with the drive gear 23A is fixed is supported for rotation on the base plate 14. A pulley 26 is fixed to the shaft 25 coaxially therewith and a pulley 27 is fixed to upper shaft 17. A timing belt 28 is passed around the pulleys 26 and 27. Thus the driving torque of the spline shaft 40 is transmitted to the upper shaft 17 through the pulleys 26 and 27 and the timing belt 28. A pulley 29 is fixed to one end (the right end as seen in FIG. 5) of the spline shaft 40.

A light-shielding film feed roller 30 is disposed below the base 11. The rotary shaft 31 of the light-shielding film feed roller 30 which is driven by a driver not shown has a pulley 32 fixed thereto. As shown in FIG. 6, a pair of light-shielding film feed rollers 33 and 34 are further provided on opposite sides of the slitter 7A. Pulleys 37 and 38 are respectively fixed to the rotary shafts 35 and 36 of the feed rollers 33 and 34. A timing belt 39 is passed around the pulleys 32, 37 and 38 on the feed rollers 30, 33 and 34 and the pulley 29 on the spline shaft 40 so that rotation of the rotary shaft 31 of the feed roller 30 causes the upper and lower cutting blades 15 and 16 to rotate in synchronization with feed of the light-shielding film 6.

The other slitting section 12B on the left side as seen in FIG. 5 has substantially the same structure as the reference side slitting section 12A and will not be described in detail here with the elements corresponding to those in the reference side slitting section 12A indicated at the same reference numerals. The former differs from the latter only in the following points. That is, since the reference side slitting section 12A has only to move a limited distance in order to conform to change in the width to which the light-shielding film 6 is to be slit whereas the opposite side slitting section 12B must be moved by a large distance, the base plate 14 of the latter is positioned on relatively long rails 13B and the slitting section 12B is moved left and right (in FIG. 5) in response to rotation of a leadscrew 21B extending in parallel to the leadscrew 21A adjacent thereto.

A drive gear 23B is fitted on the spline shaft 40 to be rotated together with the spline shaft 40 and to be slidable along the spline shaft 40 in response to travel of the base plate 14 of the slitting section 12B, and rotation of the spline shaft 40 of the feed roller 30 causes the upper and lower cutting blades 15 and 16 of the slitter 7B to rotate in synchronization with feed of the light-shielding film 6.

As shown in FIG. 7, the leadscrew drive section of the slitting machine 10 comprises an AC servomotor 41 for moving the slitting sections 12A and 12B. The servomotor 41 is provided with a reduction gear and is driven under the control of a controller (not shown). A drive pulley 44 is fixed to a shaft 43 which is connected to the output shaft of the reduction gear by way of a coupling 42.

Driven pulleys 46A and 46B are mounted respectively on the drive side end portions of the leadscrews 21A and 21B by way of electromagnetic clutches 45A and 45B. An intermediate shaft 48 is supported for rotation in an appropriate position. Three pulleys 47A, 47B and 47C are mounted on the intermediate shaft 48 and three timing belts (not shown) are passed respectively between the pulley 47C and the drive pulley 44 on the shaft 43, between the pulley 47A and the driven pulley 46A on the lead screw 21A and between the pulley 47B and the driven pulley 46B on the leadscrew 21B. Thus the driving force of the motor 41 is transmitted to the pulleys 46A and 46B respectively by way of pulleys 44, 47C and 47A and by way of pulleys 44, 47C and 47B, and then to the leadscrews 21A and 21B when the electromagnetic clutches 45A and 45B are engaged.

When the opposite slitting section 12B is only to be moved, the motor 41 is energized with the electromagnetic clutch 45A for the leadscrew 21A disengaged and the electromagnetic clutch 45B for the leadscrew 21B engaged. The leadscrews 21A and 21B are respectively provided with electromagnetic brakes 49A (FIG. 7) and 49B (FIG. 5) in order to prevent accidental movement of the slitting sections 12A and 12B by external turbulence when the slitting sections 12A and 12B need not be moved.

When slitting the light-shielding film 6 by the slitters 7A and 7B, the slitting sections 12A and 12B are moved toward or away from each other in synchronization. Accordingly when the leadscrews 21A and 21B are to be rotated in the same direction, they should be threaded in opposite directions, i.e., one having right-hand thread and the other having left-hand thread, and otherwise they are threaded in the same direction and a reverse gear or the like is inserted into the driving force transmitting path of one of the leadscrews 21A and 21B.

Figure 8:
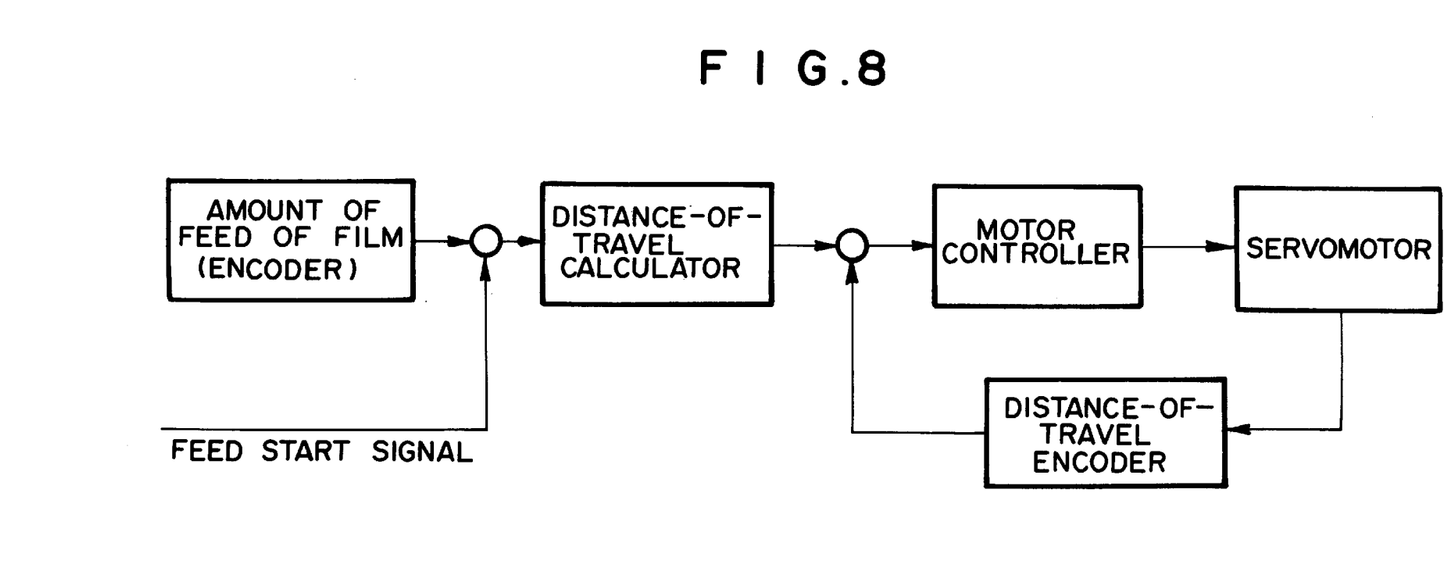
FIG. 8 is a block diagram showing the control system of the slitting machine shown in FIG. 5.

FIG. 8 is a block diagram showing the control system of the slitting machine 10.

As shown in FIG. 8, the amount of feed of the light-shielding film 6 is encoded by an encoder and input into a calculating section for calculating the distance of travel of the slitting sections 12A and 12B together with a feed start signal. The distance of travel of the slitting sections 12A and 12B calculated is input into a controller for the servomotor 41 and the motor is energized under the control of the controller, and the distance by which the slitting sections 12A and 12B were moved is encoded and input into the servomotor controller for feedback control.

What is claimed is:

1. A method of attaching a light-shielding leader to a light-room loading photosensitive material roll comprising the steps of:

mounting the photosensitive material roll on a take-up shaft, bonding a light-shielding film having a width larger than the width of the photosensitive material roll to the leading end portion of the photosensitive material roll, positioning a pair of slitters in respective slitting start positions on opposite sides of the leading end portion of the photosensitive material roll spaced from each other by a distance substantially equal to the width of the photosensitive material roll, and slitting the light-shielding film into a predetermined width larger than the width of the photosensitive material roll by moving the slitters away from each other in a direction parallel to the longitudinal axis of the take-up shaft while rotating the take-up shaft to take up the light-shielding film around the photosensitive material roll, wherein said positioning and slitting steps occur after said bonding step.

2. A method as defined in claim 1 in which said slitters are moved away from each other in a direction parallel to the longitudinal axis of the take-up shaft until the distance between the slitters reaches a predetermined value larger than the width of the photosensitive material roll and then held there for a predetermined time while the take-up shaft is rotated to take up the light-shielding film around the photosensitive material roll.

3. A method as defined in claim 1 in which said slitters are moved away from each other in a direction parallel to the longitudinal axis of the take-up shaft until the distance between the slitters reaches a predetermined value larger than the width of the photosensitive material roll, held there for a predetermined time and then moved toward each other to said respective slitting start positions while the take-up shaft is rotated to take up the light-shielding film around the photosensitive material roll.

4. A method as defined in claim 1 in which said photosensitive material roll is wound around a core having a pair of light-shielding flanges, each flange having an inclined inner peripheral surface, and said predetermined width into which said light-shielding film is slit is such that opposite edge portions of the slit light-shielding film cover the inclined peripheral inclined surfaces of the light-shielding flanges when taken up around the photosensitive material roll.

5. An apparatus for attaching a light-shielding leader to a light-room loading photosensitive material roll comprising:

a take-up shaft on which the photosensitive material roll is mounted, said photosensitive material roll having a light-shielding film bonded thereto having a width greater than a width of the photosensitive material roll, a pair of slitters which are movable in a direction parallel to the longitudinal axis of the take-up shaft for slitting opposite edges of said light-shielding film into a predetermined width larger than the width of the photosensitive material roll, and a slitter moving means which moves the slitters in synchronization with each other while the take-up shaft is rotated.

* * * * *